(12) United States Patent
Algiene

(10) Patent No.: US 7,316,350 B2
(45) Date of Patent: Jan. 8, 2008

(54) MULTI-PURSE CARD SYSTEM AND METHODS

(75) Inventor: Ken Algiene, Littleton, CO (US)

(73) Assignee: First Data Corporation, Greenwood Village, CO (US)

( * ) Notice: Subject to any disclaimer, the term of this patent is extended or adjusted under 35 U.S.C. 154(b) by 319 days.

(21) Appl. No.: 10/421,604

(22) Filed: Apr. 22, 2003

(65) Prior Publication Data
US 2004/0211830 A1    Oct. 28, 2004

(51) Int. Cl.
*G06K 5/00* (2006.01)
(52) U.S. Cl. .................. 235/380; 235/379; 705/41
(58) Field of Classification Search ............. 235/379, 235/380; 705/35, 42, 41
See application file for complete search history.

(56) References Cited

U.S. PATENT DOCUMENTS

| | | | |
|---|---|---|---|
| 4,528,643 A | 7/1985 | Freeny, Jr. | |
| 4,700,055 A | 10/1987 | Green | |
| 4,884,212 A | 11/1989 | Stutsman | |
| 5,027,316 A * | 6/1991 | Frantz et al. | 710/11 |
| 5,146,067 A | 9/1992 | Sloan et al. | |
| 5,220,501 A | 6/1993 | Lawlor et al. | |
| 5,255,182 A | 10/1993 | Adams | |
| 5,352,876 A | 10/1994 | Watanabe et al. | |
| 5,440,108 A | 8/1995 | Tran et al. | |
| 5,471,669 A | 11/1995 | Lidman | |
| 5,477,038 A | 12/1995 | Levine et al. | |
| 5,504,808 A | 4/1996 | Hamrick, Jr. | |
| 5,511,114 A | 4/1996 | Stimson et al. | |
| 5,513,117 A | 4/1996 | Small | |
| 5,557,516 A | 9/1996 | Hogan | |
| 5,590,038 A * | 12/1996 | Pitroda | 705/41 |
| 5,592,400 A | 1/1997 | Sasou et al. | |
| 5,637,845 A | 6/1997 | Kolls | |
| 5,678,010 A | 10/1997 | Pittenger et al. | |
| 5,721,768 A | 2/1998 | Stimson et al. | |
| 5,796,832 A | 8/1998 | Kawan | |
| 5,826,243 A * | 10/1998 | Musmanno et al. | 705/35 |
| 5,868,236 A | 2/1999 | Rademacher | |
| 5,903,633 A | 5/1999 | Lorsch | |
| 5,936,221 A | 8/1999 | Corder et al. | |
| 5,984,181 A | 11/1999 | Kreft | |
| 5,987,438 A | 11/1999 | Nakano et al. | |
| 5,991,748 A | 11/1999 | Taskett | |
| 6,006,988 A | 12/1999 | Behrmann et al. | |
| 6,029,888 A * | 2/2000 | Harvey | 235/379 |
| 6,108,641 A * | 8/2000 | Kenna et al. | 705/35 |
| 6,129,275 A | 10/2000 | Urquhart et al. | |
| 6,145,740 A * | 11/2000 | Molano et al. | 235/380 |
| 6,169,975 B1 | 1/2001 | White et al. | |
| 6,193,155 B1 | 2/2001 | Walker et al. | |
| 6,295,522 B1 | 9/2001 | Boesch | |

(Continued)

*Primary Examiner*—Uyen-Chau N. Le
(74) *Attorney, Agent, or Firm*—Townsend and Townsend and Crew LLP

(57) ABSTRACT

The invention relates, in part, to a computerized method for managing electronically stored value accounts which comprises storing at a host computer system a plurality of stored value customer accounts that each comprise a unique identifier. At the host computer system, requests are received from a point of sale device to activate at least some of the accounts. The requests to activate comprise unique identifiers and values that are associated with the identifiers. Also received at the host computer system is a request to transfer value from one of the customer accounts to another one of the customer accounts. The requested value is electronically transferred between the accounts.

45 Claims, 10 Drawing Sheets

U.S. PATENT DOCUMENTS

| | | |
|---|---|---|
| 6,298,336 B1 | 10/2001 | Davis et al. |
| 6,405,182 B1 | 6/2002 | Cuervo |
| 6,473,500 B1 | 10/2002 | Risafi et al. |
| 6,510,983 B2 | 1/2003 | Horowitz et al. |
| 6,606,744 B1 * | 8/2003 | Mikurak ................ 705/26 |
| 6,612,487 B2 * | 9/2003 | Tidball et al. ............ 235/380 |
| 6,873,690 B2 * | 3/2005 | Moon et al. ............ 379/114.2 |
| 6,934,528 B2 * | 8/2005 | Loureiro et al. ............ 455/406 |
| 2001/0018660 A1 | 8/2001 | Sehr |
| 2001/0023409 A1 | 9/2001 | Keil |
| 2001/0023415 A1 | 9/2001 | Keil |
| 2001/0047342 A1 | 11/2001 | Cuervo |
| 2002/0022966 A1 * | 2/2002 | Horgan ................ 705/1 |
| 2002/0038289 A1 * | 3/2002 | Lawlor et al. ............ 705/42 |
| 2002/0174016 A1 | 11/2002 | Cuervo |
| 2003/0053609 A1 | 3/2003 | Risafi et al. |
| 2003/0236728 A1 * | 12/2003 | Sunderji et al. ............ 705/35 |
| 2006/0078100 A1 * | 4/2006 | Risafi et al. ............ 379/114.2 |

* cited by examiner

YOU HAVE SELECTED 20 POINTS TO BE TRANSFERRED FROM YOUR E1 POINTS PURSE TO YOUR E2 CASH PURSE AT AN EXCHANGE RATE OF 2 POINTS = $1.

| Universal Card | Points Purse | Cash Purse | Purchases Purse |
|---|---|---|---|
| Account 1345267893435 | 75 | $10 | 8 |
| Entity #1 | | | |
| Account 325467892453 | 3 | $4 | 3 |
| Entity #2 | | | |
| Account 4326943058342 | 93 | $108 | 14 |

☐ CONFIRM TRANSFER

MULTI-PURSE CARD SYSTEM AND METHODS

BACKGROUND OF THE INVENTION

This invention relates generally to the field of stored value accounts, and in particular to the management of such accounts. More specifically, the invention relates to the transfer of value between stored value accounts that are associated with different entities, as well as the management and transfer of value between different value types or purses within a single account or between accounts.

Stored value accounts have gained widespread use in the United States, among other countries. Such stored value accounts are typically associated with a card having an account number, and are often referred to as "gift cards." These cards can often be purchased at a retail location for a specified amount, e.g., twenty dollars. After paying for the card, the account number is read from the card, such as by using a mag stripe reader on a point-of-sale device. The account number is transmitted to a database where the account is activated for twenty dollars. Each time a purchase is made, the account is debited by the purchase amount.

One issue that arises in connection with such cards is that a wide variety of retail locations now utilize their own cards. Hence, a customer may have multiple gift cards from multiple retail locations. In a typical scenario, if a customer wishes to make a purchase at one retail entity or location, the customer provides the gift card that is associated with that retail location. When making a purchase from another retail entity or location, the customer must provide a gift card that is specific to that particular retail entity. Another issue that arises with such gift cards is that they are typically associated with one type of value, such as cash. Other types of value are typically not associated with such gift cards.

Hence, this invention is related to addressing these and other issues to make such stored value cards more versatile and economically attractive, both to the end use as well as the retailer.

BRIEF SUMMARY OF THE INVENTION

The invention provides various systems and methods for managing stored value accounts. Stored value customer accounts are typically stored at a host computer system. Each customer account is associated with a unique identifier. In some cases, a value is associated with the unique identifier once a request is received at the host computer system to activate the account. The request typically includes a value that is to be associated with account along with the unique identifier. Conveniently, this request may initiate from a point of sale device where the customer purchases a presentation instrument having the unique identifier and provides a form of payment. At any time, a consumer may request to transfer value from one of the customer accounts to another one of the customer accounts by providing such a request to the host computer system. Once the request is received, the host computer system may electronically transfer the requested value between the accounts. Hence, with such a method a customer having multiple stored value accounts may transfer value between the accounts by initiating a simple request that is transmitted to the host computer system. Such a request may include the account identifiers for the two accounts between which the value is to be transferred and the amount of the transfer.

In some cases, a customer may wish to associate a plurality of customer accounts into a combined account. To do so, a registration request may be sent to the host computer system to associate the accounts. The registration request may include the account identifiers for the specific customer accounts that are to be associated, a user name and a password. In this way, a customer may access and log onto a website or access a voice response unit in order to manage their various accounts. Conveniently, the host computer system may generate an electronic summary document containing a summary of each of the customer accounts in the combined account. This document may be transmitted over a network to the customer's computer so that a summary of each stored value account may conveniently be viewed. Using the website, the customer may also transfer value between the accounts. For example, the host computer system may generate an electronic transfer document that contains fields for entering a request to transfer value between the customer accounts. This transfer document may be transmitted over the network to the customers computer. In this way, the customer simply needs to fill in the fields with the amount of the value that is to be transferred and then submits this information over the network to the host computer system. The computer system may also produce a confirmation document containing a summary of the transfer request. This document may be transmitted over the network to the customers computer to permit the customer to view the transfer request before it is performed. If the summary of the transfer request is correct, the user may select a confirmation icon to transmit an approval back to the host computer system to effect the transfer.

In one particular aspect, the stored value account may be associated with different entities. In this way, the host computer system may perform various accounting functions between the entities based on how the value is transferred. For example, if ten dollars is transferred from the account of one entity to the account of another entity, the host computer system may be configured to perform the back end accounting to complete the transaction. Examples of how such a reconciliation and payment may occur is described in copending application Ser. No. 10/356,207, filed Jan. 30, 2003, the disclosure is which is hereby incorporated by reference.

In another aspect, at least some of the stored value accounts may include multiple purses that correspond to different types of stored values. Examples of such purses include point purses, cash value purses, number of purchases purses, and the like. When such stored value accounts include purses, the request to transfer the value may include an indication of one of the purses from each of the customer accounts involved in the transfer. For example, a cash value purse from one of the accounts may have value transferred to a points purse of another stored value account. The transfer of value between the purses may also occur as an intra-customer account transfer where the value is transferred between purses of the same stored value account. Alternatively, the transfer may be an inter-account transfer where value is transferred across different customer accounts. When transferring value between purses having values of different types, or even between purses of the same type, a value conversion may be performed. For example, two points may correspond to one dollar. As another example, two dollars for one customer account may be worth only one dollar for another customer account.

In a further aspect, the host computer system may store promotional information. Such promotional information may include promotions to encourage transferring of value between customer accounts. For example, one entity may offer additional points or cash value if the customer chooses to transfer points or cash from another entity's account. The promotional information may also include promotions to encourage adding value to certain customer accounts. For example, if a certain number of purchases are made, additional value may be added to the account. Further, promotions may be provided to encourage the value from certain customer accounts to purchase certain goods or services. For example, if value is used to purchase a certain item, another item may be offered at a discount.

In one particular aspect, a customer may add value to an existing account by transmitting reload information on the purchase of value to the host computer system. For example, the user may go to a retail location and purchase additional value. This information may then be transmitted from a point-of-sale device to the host computer system. In a further aspect, expiration dates may be set on the customer account. For example, if accounts are not used within a certain time period, the value may be reduced over time or simply eliminated altogether.

The host computer systems of the invention may be configured to have one or more inputs for receiving information over a network from one or more point-of-sale devices or from various other computers. The host computer system may also include one or more outputs for transmitting information back to the point-of-sale devices or the other computers. The host computer system may also include a processor and memory accessible by the processor which typically includes a plurality of stored value customer accounts that each comprise a unique identifier and a value associated with the identifier. With such a configuration, one of the inputs may be used to receive transaction information from point-of-sale devices. These may include requests to activate the accounts along with an associated value or to reload value onto an existing account. The inputs may also be used to receive transfer information to transfer value between purses and/or between accounts. The output may be utilized to transfer confirmation information back to the point-of-sale devices and/or to transmit documents to other computers to facilitate the transfer of value between purses and/or accounts. The inputs may also be utilized to receive various rules from entities relating to how accounts may be managed. Such information may include, for example, promotions, expiration dates, exchange rates, and the like. As a further example, the inputs may be utilized to receive information to establish a combined or universal account where one or more existing accounts are linked together.

BRIEF DESCRIPTION OF THE DRAWINGS

FIG. 9 illustrates one embodiment of a screen display for confirming a value transfer request according to the invention.

DETAILED DESCRIPTION OF THE INVENTION

Figure 1A:
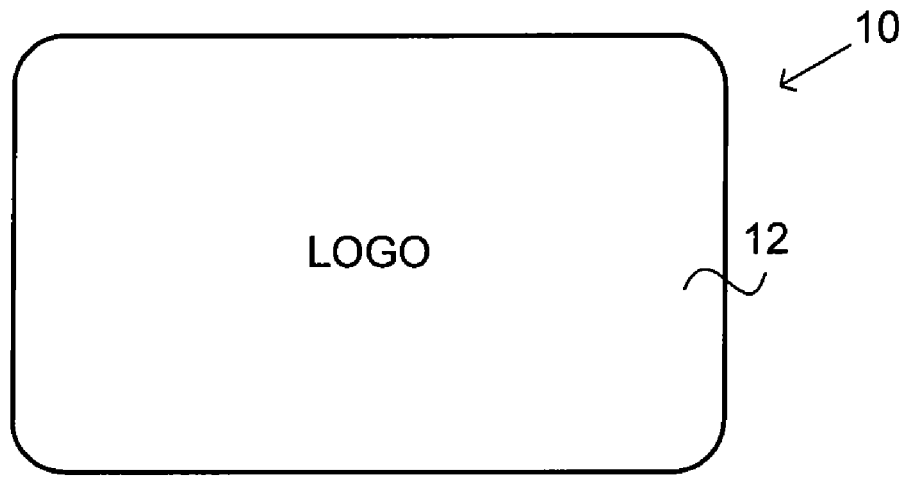
FIG. 1A is a front view of one embodiment of a presentation instrument that may be used with the invention.

The invention provides various systems and methods for managing electronically stored value accounts. One way to manage such accounts is to provide customers with a way to transfer value between different accounts. This value transfer may occur between accounts set up with the same entity or between accounts of different entities. For example, a customer may have two stored value accounts with a video chain and may desire to transfer all of the value from one of the accounts to another one of the accounts. As another example, the customer may also have an account with a hardware store. According to the invention, the value on one of the video chain stored value accounts may be transferred to the hardware store's account.

Another feature of the invention is that each account may have multiple purses associated with it. The purses may comprise different types of value that are associated with the same account. For example, one account may have a cash value purse, a points value purse, a purchases purse, and the like. The invention also provides techniques for managing the transfer between purses of the same account and/or between purses of different accounts, including across entities. To do so, various rules may be provided for converting value between the different value types and/or between the same value types. To facilitate the management of such accounts, the invention also provides techniques for combining various accounts into a combined or universal account. For example, a customer may register two stored value accounts into a universal account. The universal account may have its own unique identifier, or may simply utilize an identifier of one of the existing accounts. Further, the consumer may set up various rules as to how value should be apportioned between the different accounts within the universal account. This apportionment may occur when the value is added to one or more of the accounts and/or is extracted from one or more of the accounts. Hence, with such a universal account, a consumer may use a video chain stored value card to make purchases at a hardware store or vice versa. When making such a transaction, the consumer may simply provide their universal identifier to the retailer. When the request is received at the host computer system, the rules are evaluated to determine how value should be debited. When reloading value onto one or more accounts, a similar process may be utilized in various systems and methods may also be utilized to provide promotions in association with such stored value accounts. For example, one or more entities may provide the host computer system with rules that specify various promotions associated with one or more of the accounts. Such promotions may encourage customers to transfer value between accounts, to save up value in accounts, and the like. For example, one entity may provide a good or service for a discount if a certain number of purchases and/or reloads are performed. As another example, an entity may encourage value to be transferred from other entities and/or purses by providing a discount if value is transferred to that particular account.

The stored value of an account typically has an associated identifier that may be conveniently be stored on a presentation instrument, such as a card. Such presentation instruments may initially be in an inactive state where no value is associated with the presentation instrument. To associate a value with the account, a consumer may purchase one of the cards for a certain amount, such as fifty dollars. Conveniently, this transaction (referred to as an activation) may be processed at a merchant location. In such cases, the merchant collects a payment, using cash, credit card, debit card or any other acceptable form of payment, and enters this information into a point-of-sale device. The account identifier associated with the presentation instrument is also entered into the point-of-sale device. For example, the identifier may be stored on a magnetic stripe, on a bar code label, or the like. Examples of such point-of-sale devices that may be used to capture and/or transmit such information to a host computer system are described in copending U.S. application Ser. No. 10/116,619, filed Apr. 3, 2002, the complete disclosure which is herein incorporated by reference. However, it will be appreciated that the invention is not intended to be limited to a specific type of processing/reading device. For example, other ways of transmitting information include by telephone (such as by using an IVR system), by contacting a customer service representative or the like. Reload transactions, where value is added to an existing account, may occur in a similar manner.

Such information is transmitted to the host computer system which has a record of the account identifier. Such information may be transmitted across a variety of networks including telephone networks, credit card networks, wide area networks, the Internet, wireless networks, and the like. Further, depending on the type of processing device used to transmit the information, such devices may also be coupled to a financial network, such as a credit card or ATM network, or may have a direct connection to the host computer system. If connected to a financial network, the host computer system may be configured to determine that the transaction is related to a stored value account rather than a traditional credit or debit card and may process the information appropriately.

When such information is received at the host computer system, the value that was paid by the consumer is associated with the account identifier. In so doing, the account is activated so that the consumer may then use the presentation instrument for making a subsequent purchase.

To redeem part or all of the value associated with the presentation instrument (referred to as a redemption transaction), the consumer simply needs to provide the account identifier at the time of redemption. For example, if a consumer desired to purchase a video, the consumer may simply provide the presentation instrument to the clerk at the time of check out. The identifier may then be read from the presentation instrument using a point-of-sale device and transmitted back to the host computer system. Along with this information, a location of the transaction may also be transmitted. This may be entered and transmitted using any of the techniques previously described. The host computer system is configured to determine the amount of value remaining in the account and to debit the account by the transaction amount if sufficient value exists in the account.

Further, information confirming the transaction may be transmitted back to the point-of-sale device.

Other information regarding the transaction that may be transmitted back to the point-of-sale device includes the amount debited, the new balance, and the like. This information may be displayed by the point-of-sale device and may optionally be printed to provide a paper receipt.

Consumers typically perform transactions, such as redemptions, activations, reloads and the like at merchant locations, such as stores, using the Internet or from some other type of network. These stores may be part of the same business entity or may be separate. For example, a bagel franchise may have stores in California that are owned and operated by one business entity, while the stores in Oregon are owned and operated by another business entity. When transactions are performed, they are transmitted to the host computer system for processing. The host computer system is also used to determine appropriate credits and debits to each entity's bank account based on certain criteria. Periodically, the host computer system may prepare requests to transfer funds into and out from the entities' bank accounts in accordance with the criteria.

For example, according to one scheme, each transaction is tracked to determine its location. The transaction location is compared with the entity where the associated account was activated (referred to as the originating entity). Based on the type of transaction and whether the transaction locations is within the originating entity, an entity's bank account may be credited or debited during the next reconciliation cycle.

As another example, a central bank account may be used to reconcile each entity's bank account. With such an embodiment, only the location where the transaction originated need be monitored. Periodically, each entity's bank account is brought to a zero balance by transfers to or from the central bank account based on whether the entity has a positive or a negative transaction total for a given period.

Figure 1B:
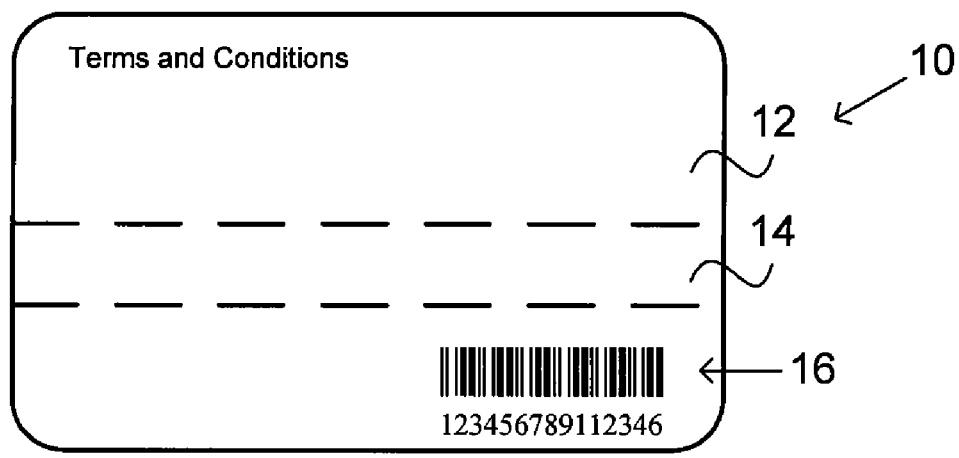
FIG. 1B is a rear view of the presentation instrument of FIG. 1A.

Referring now to FIGS. 1A and 1B, one embodiment of a presentation instrument 10 that may be used with the invention will be described. In general, the presentation instruments of the invention may be constructed of a wide variety of materials that are capable of storing an identifier that uniquely identifies the associated account. For example, the material may comprise a card 12 (that in turn may be constructed of plastic, cardstock, paper, or the like). Other materials include a computer disk (such as a CD, DVD or the like) or other tangible media. Further, the identifier may be stored in a variety of formats, such as in print, on magnetic media (such as a magnetic stripe 14), in a bar code format 16, in a computer processor (also known as a smart chip) or the like. Appropriate readers may be employed at the point-of-sale to read such formats and then transmit them to the host computer system for processing. Card 12 may also include merchant identification information, such as a name, logo, or the like.

Figure 2:
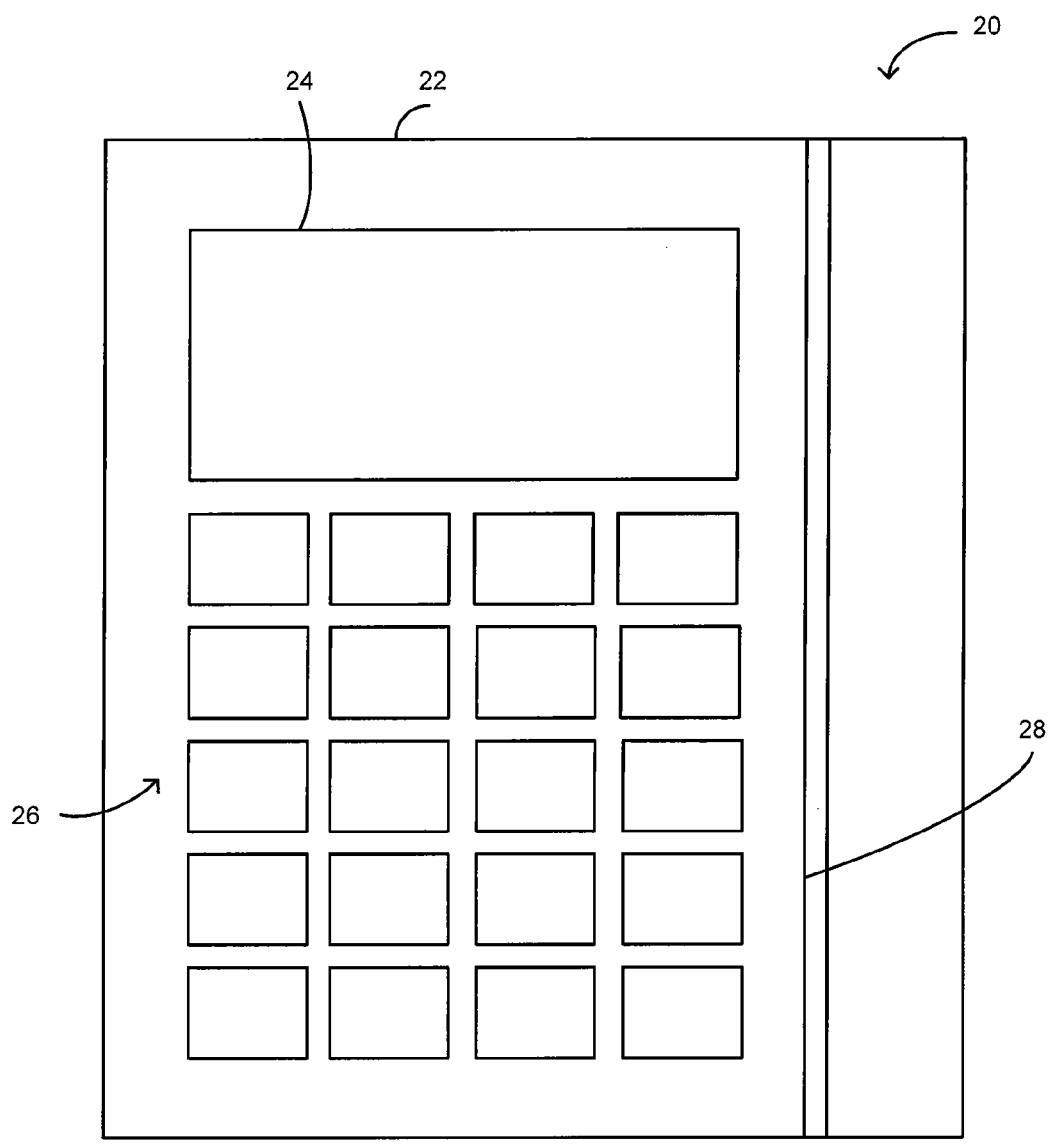
FIG. 2 is a schematic view of a diagram of a point-of-sale device that may be used in accordance with the present invention.

Referring now to FIG. 2, a point-of-sale device 20 that may be used will be described in greater detail. In so doing, it will be appreciated that the invention is not intended to be limited for use with only a specific type of point-of-sale device. Indeed, any type of processing or computing device that may transmit and receive data over a network may be used.

Point-of-sale device 20 comprises a housing 22 having a display screen 24 and input devices 26. Conveniently, input device 26 may comprise keys or buttons that may be depressed to enter information into a point-of-sale device 14. Input devices 26 may each be associated with one or more letters or other alpha numeric characters, or may operate as function keys.

Figure 3:
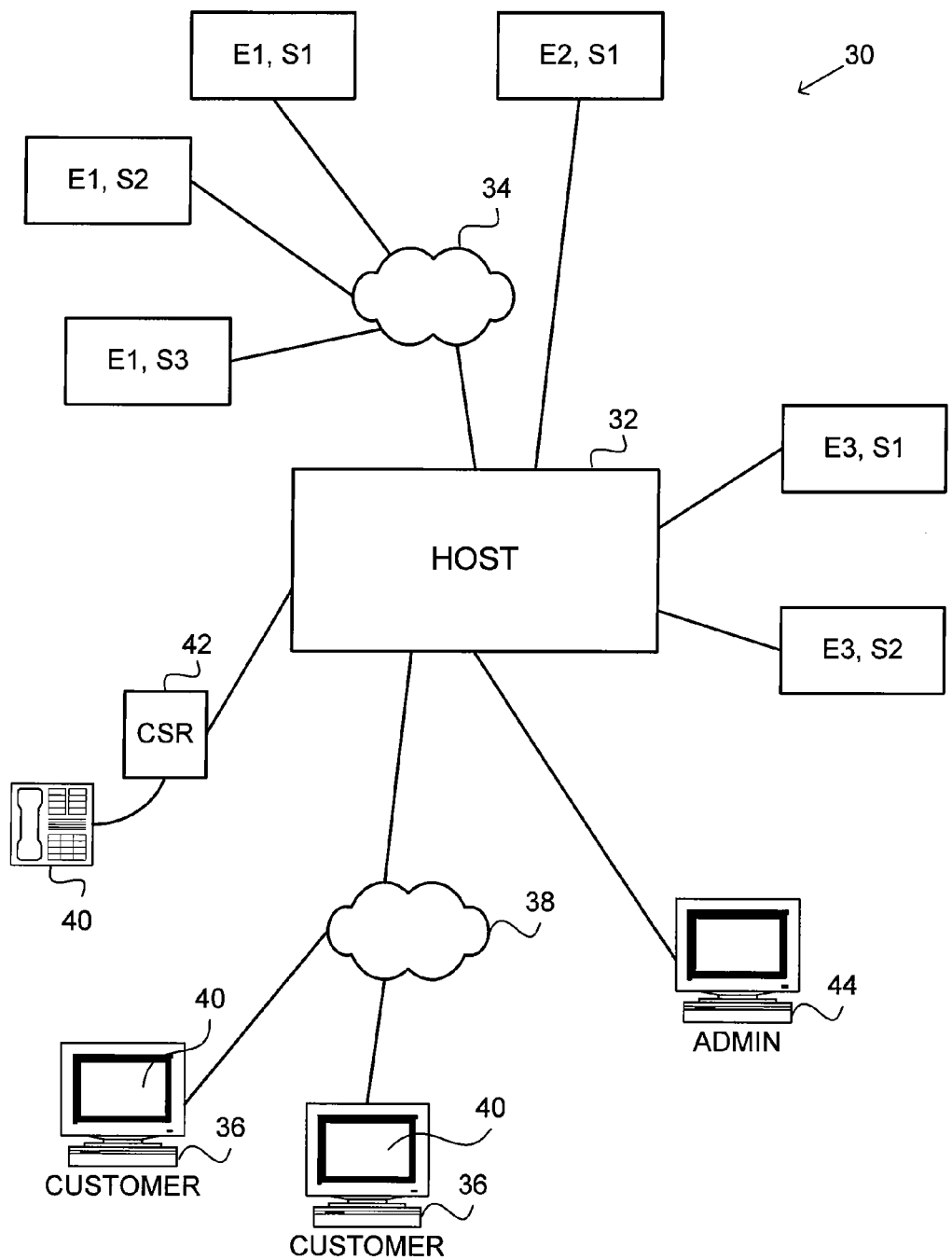
FIG. 3 is a schematic diagram of a system that may be utilized to manage stored value accounts according to the invention.

Referring now to FIG. 3, one embodiment of an account management system will be described. Account management system 30 comprises a host computer system 32 that is used to store a wide variety of information relating to stored value accounts as well as to facilitate management of such accounts. One of the functions of host computer system 32 is to maintain account identifiers for each of the accounts and an associated value, if available. As accounts are activated, credited and/or debited, host computer system 32 is employed to perform these functions in a manner similar to that described herein, as well as in copending U.S. application Ser. No. 60/392,958, filed Jun. 28, 2002, U.S. application Ser. No. 10/268,040, filed Oct. 8, 2002, U.S. application Ser. No. 10/267,180, filed Oct. 8, 2002, U.S. application Ser. No. 10/286,006, filed Nov. 1, 2002, U.S. application Ser. No. 10/356,207, filed Jan. 30, 2003, U.S. application Ser. No. 10/371,167, filed Feb. 21, 2003, the complete disclosures of which are herein incorporated by reference. As such, host computer system 32 may include appropriate hardware, software and databases for these functions as is known in the art. How computer system 32 may also include appropriate inputs and outputs for receiving and transmitting information in electronic form. For example, information may be received from point-of-sale devices, voice response units, server computers, personal computers, wireless devices and the like. Similarly, outputs may be transmitted to any device capable of receiving electronic documents.

Another function of host computer system 32 is to permit information on accounts to be accessed by account managers as well as by consumers themselves. This allows account managers to view the status of their accounts as well as to input various rules associated with the accounts. For example, account managers may input rules giving exchange rates for exchanging values between accounts and/or purses, promotional rules, loyalty rules, coupon information, expiration information, other rules and conditions, and the like. On the customer side, host computer system 32 permits consumers to visualize their account information as well as to transfer value between accounts and/or purses.

As shown in FIG. 3, customer transaction data may originate from a variety of sources, including from a plurality of retail stores, including stores that are part of different business entities. For convenience of discussion, each store is labeled with an entity number, E, and a store number, S. As shown in this non-limiting example, entity 1 has three different stores, entity 2 has one store, and entity 3 has two stores. However, it will be appreciated that the invention is not intended to be limited to this particular arrangement of entities and stores, and may be varied to accommodate existing business arrangements. As will be appreciated, the entities and stores may be connected to host computer system 32 in a variety of ways. For instance, entity 1 may be part of a local area network 34 that is connected to host computer system 32, while entities 2 and 3 utilize direct dial up connections. However, other types of networks and/or connections may be used as is known in the art. Further, each store may utilize different communication devices to transmit and receive transaction information, including point-of-sale devices, kiosks, other computers and the like.

To access account information, a customer may utilize a customer computer 36 that may be any type of device that may communicate over a network 38, such as the Internet, the phone network, wireless networks and the like. To access host computer system 32, the consumer may access a web site and login giving certain information, such as an account identifier, a user name, a password, or the like. Host computer system 32 may be configured to transmit documents over network 38 to permit them to be displayed on a display screen 40 of computer 36 as is known in the art. Also, information may be input into computer 36 and transmitted back to host computer system 32 as is known in the art. In some cases, the customer may log into a web site of a particular identity. The customer may be directed to another server that is connected to host computer system 32 or may enter the information directly into the entity's computer system that in turn communicates with host computer system 32.

Management system 30 may also utilize a voice transmission device 40, such as a telephone, cell phone, mobile phone or the like to access host computer system 32. As one example, device 40 may be used to speak with a customer service representative 42 that may have access to the information in host computer system 32, such as by using a computer that is coupled to host computer system 32. Alternatively, a voice response unit may be accessed to receive and input information from and to host computer system 32 using device 40.

Management system 30 may also include one or more administrative computers 44 to facilitate management of the accounts. For example, each entity may utilize one of the administrative computers to view information on its customers, to make adjustments to accounts, to input rules, promotions, expiration dates, and the like, as well as other general administrate items.

Figure 4:
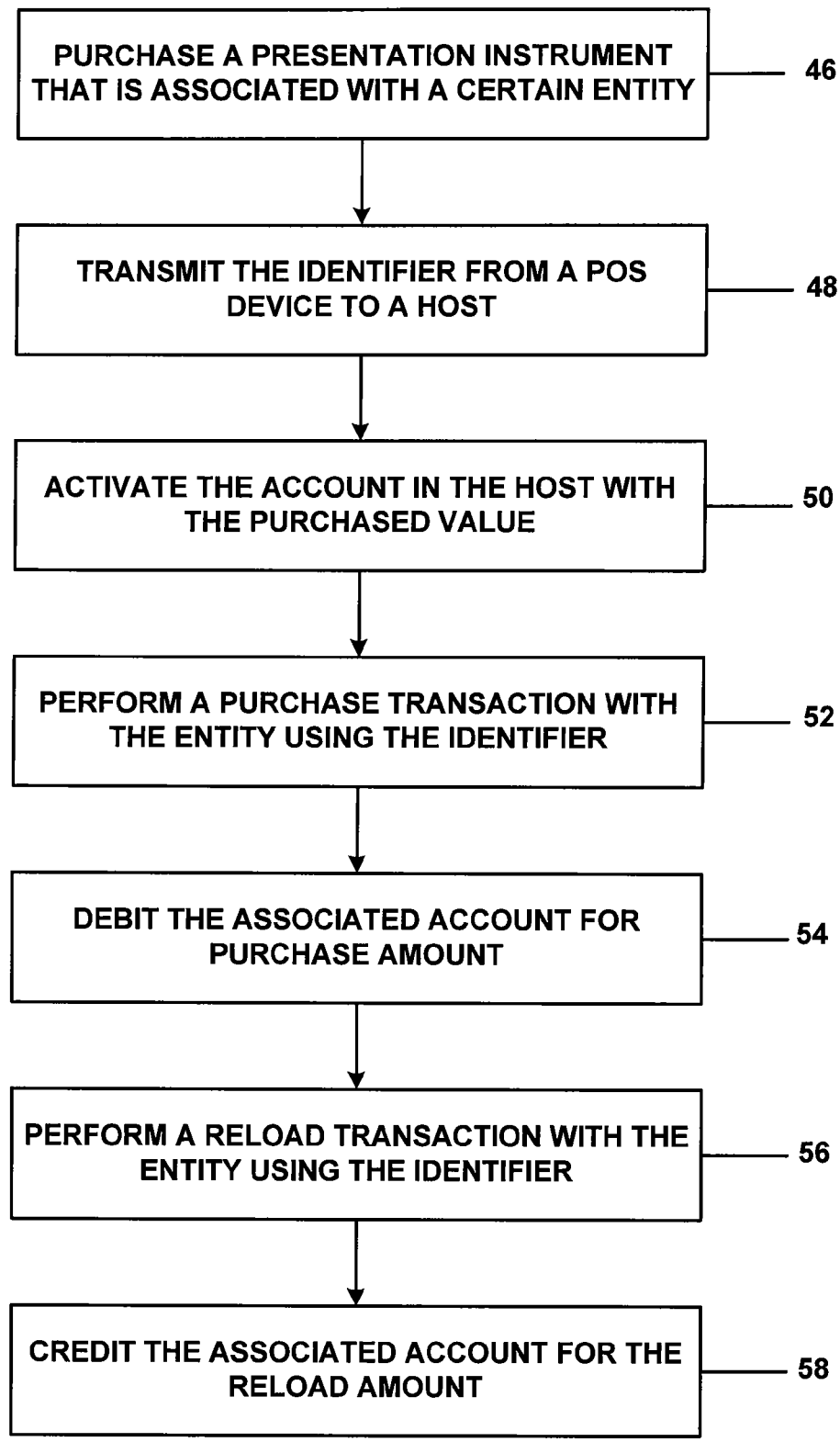
FIG. 4 is a flow diagram illustrating one method for initiating stored value accounts or adding value to existing stored value accounts according to the invention.

Referring now to FIG. 4, one method for activating and using a customer account will be described. In so doing, it will be appreciated that the method set forth in FIG. 4 may be implemented using management system 30. As shown in step 46, to set up an account, a customer may simply purchase a presentation instruction, typically at a retail location. The customer provides a form of payment in the amount that is to be associated with the account.

At step 48, the identifier and the amount of the value paid is transmitted from a point of sale device to a host computer system, although the identifier may be transmitted in other ways as well. At step 50, the account is activated by associating the value with the identifier that is maintained at the host. Once activated, the customer may use the presentation instrument to make purchases. For example, as shown in step 52, the customer may have the account identifier read off of the presentation instrument and transmitted to the host along with the purchase amount. The customer account at the host computer system may then be debited by the purchase amount as shown in step 54. If the account does not have sufficient value to cover the cost of the purchase, the request may either be denied, or else the customer may be asked to provide enough additional funds to cover the difference.

Whenever needed, the customer may reload funds into an existing account as shown in step 56. This may be done by making a payment and then transmitting the payment amount along with the identifier to the host where it is associated with the account as shown in step 58.

Figure 5:
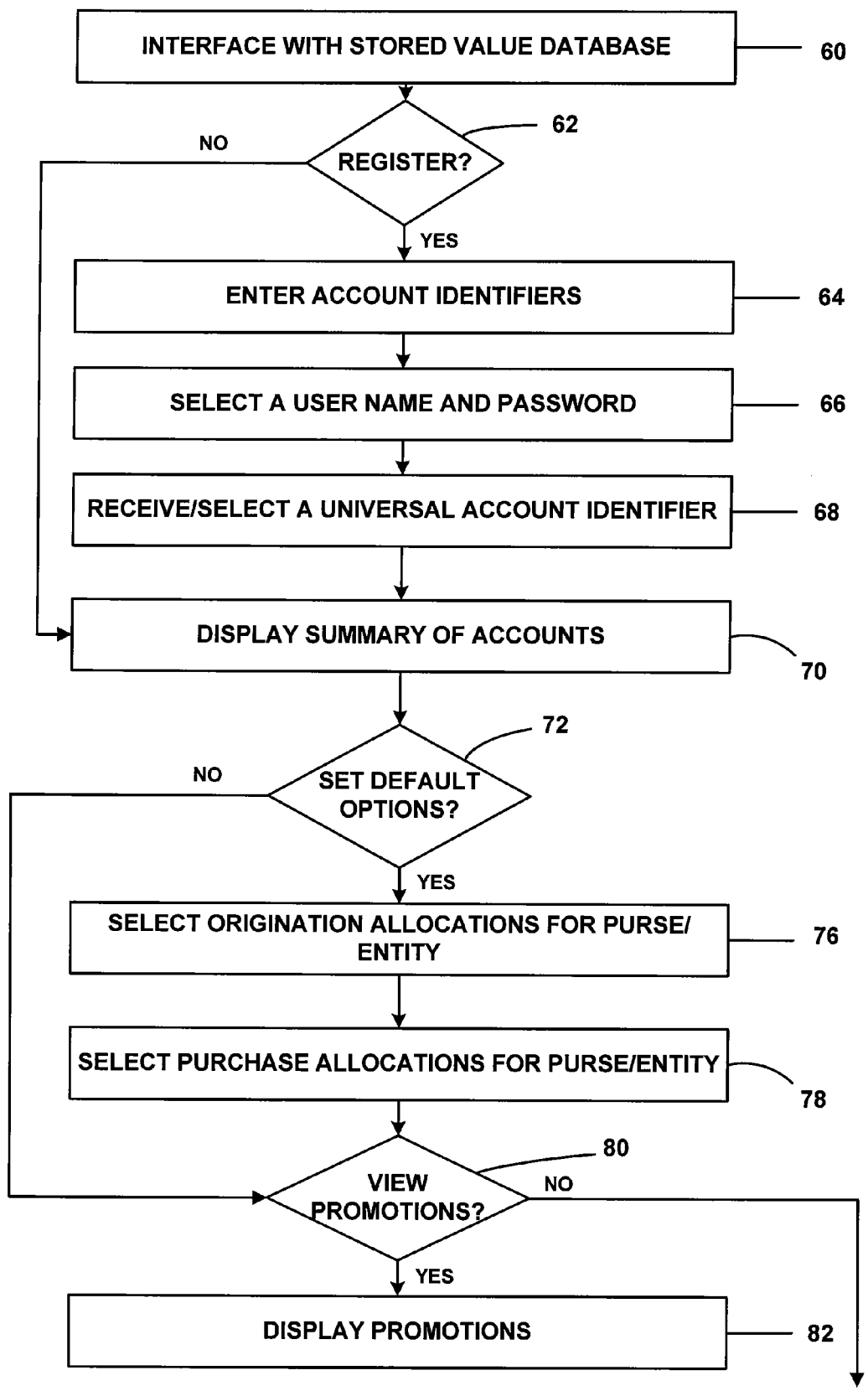
FIG. 5 is a flow diagram indicating one exemplary method for managing stored value accounts according to the invention.
Figure 5:
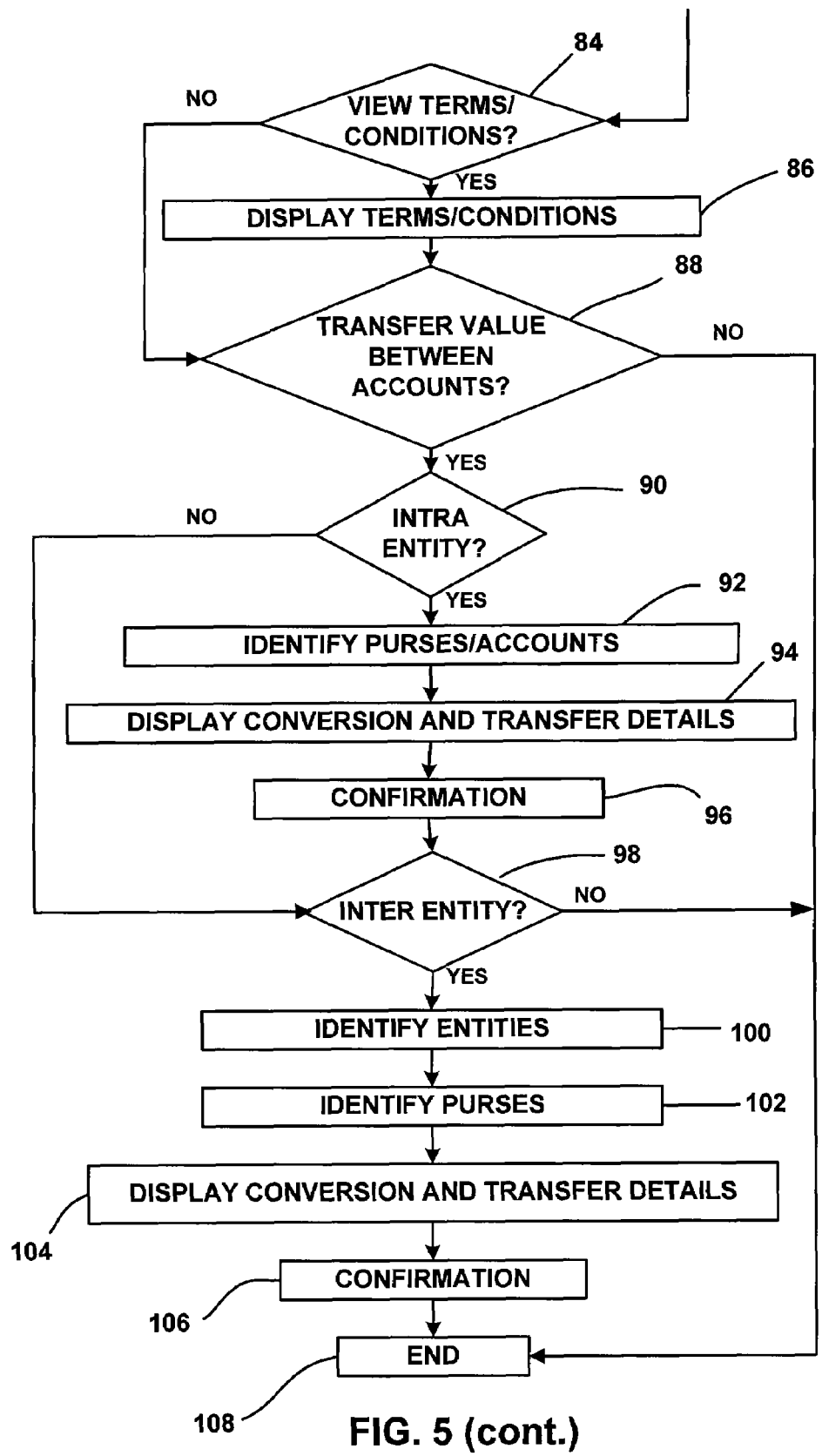

FIG. 5 illustrates ways in which a customer may manage one or more accounts. In step 60, the customer interfaces with the stored value database. This may be accomplished by interfacing with the host computer system using any of the techniques described herein. If the customer has not already registered, the customer may be given that option in step 62. In some cases, the customer may not be required to register and may simply view accounts or transfer value between them simply by identifying the accounts.

One example of how the host may be accessed is by use of a web site. When reaching the home page of the web site, the customer may be asked whether he or she would to register as a user. If so, the customer may be asked to enter one or more account identifiers as shown in step 64. This may be accomplished, for example, by reading the numbers off of the presentation instrument. Optionally, the user may also register a user name and password as shown in step 66 so that only they will be able to access the accounts. If desired, the customer may select or be assigned a universal account number as shown in step 68. In this way, the customer may utilize the universal number to associate all of the other accounts. For example, when making future purchases or reloads, the customer may be able to use the universal account number, regardless of which entity is involved. For instance, the same universal account identifier may be used when making purchases at a video chain as well as at a home and garden store. When the universal account identifier is received at the host computer system, it will know which customer accounts are associated with the universal account identifier. Value may then be debited or credit based upon rules that are associated with the accounts as described hereinafter. Conveniently, the customer may select one of the existing account identifiers as the universal account identifier. In this way, the customer may use an existing presentation instrument as their universal instrument. As such, the same presentation instrument may have its account identifier read by a point of sale device, bar code reader, or the like at any entity that the customer has registered with the universal account identifier.

Figure 7:
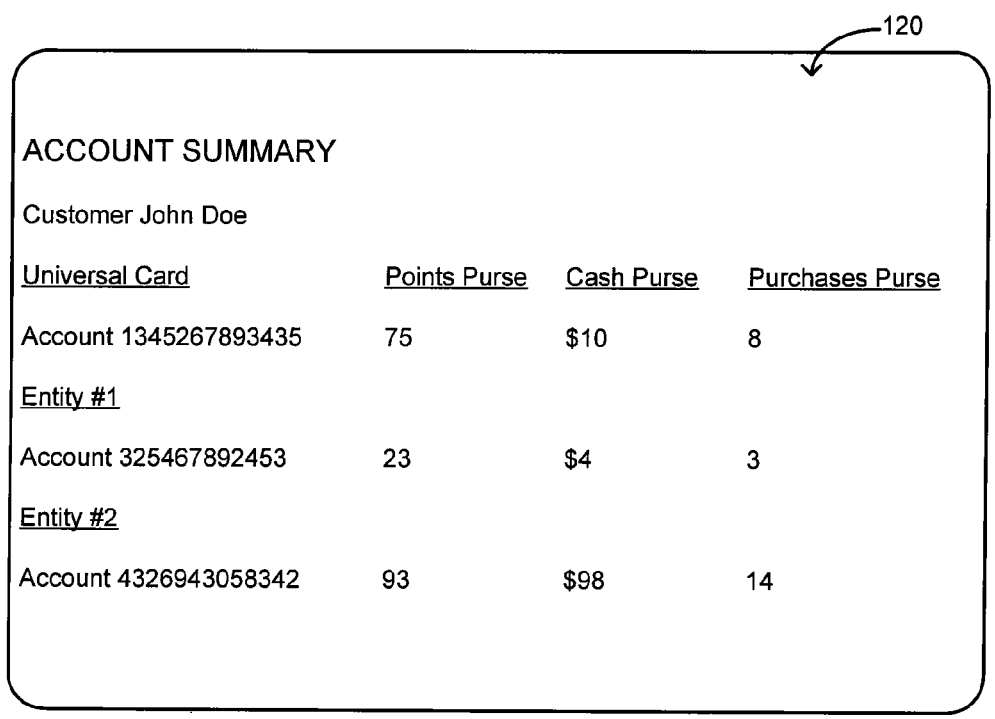
FIG. 7 illustrates one embodiment of a screen display showing an account summary of various stored value accounts according to the invention.

Once the customer has at least entered one or more account identifiers, information relating to those accounts may be displayed as illustrated in step 70. One example of how such information may be displayed on a display screen of the customer's computer is illustrated in FIG. 7. Examples of information that may be displayed include: the account identifiers, a customer name, value associated with the accounts, including value in different types of purses, expiration information, promotional or loyalty information, and the like.

In some cases, a customer may desire to set various default options as shown in step 72. For example, the customer may select a default on how to allocate credits that are to be added to an entity or purse as shown in step 74. In this way, the customer can select how value will be added when reloading value. For instance, if the customer had three accounts with three different entities, the default may be to credit only one of the accounts with value, regardless of which account identifier was used. This may be beneficial, for example, if one of the entities had a more favorable loyalty program or exchange rate when transferring value into the account. The default allocation may also be by percentages so that each account receives a certain percentage. The allocation may be by purse as well as by entity so that the value may further be divided up into certain purses within an account.

As shown in step 78, the customer may also select defaults for how value will be taken out of an entity account, or a purse within an account. For example, the default may be to take out value from an account associated with an entity where the purchase is taking place, and if there is not sufficient value, where the rest of the value should originate. As another example, the default could be set in ways similar to those previously described in connection with how value is added to accounts. In this way, if it is more beneficial to use one account to make purchases than another, the customer may tailor options for taking value out of that account when making a purchase. As a further example, the default may simply be to credit or debit part or all of the value to a universal account.

The customer may also have the option of viewing promotional information as shown in step 80. This information may be obtained, for example, by selecting an icon on the customer's display screen, through a VRU, by a customer service representative, or the like. Once this option is selected, the various promotions are displayed as shown in step 82. Such promotions may include for example, incentives to adding value to an account, either through purchases, reloads, or transfers from other accounts, and the like. Such information may be input into the host and/or managed by each entity and/or by the operator of the host computer system.

As shown in step 84, the customer may also be provided with the option of viewing terms and conditions associated with their accounts. If this option is selected, the desired terms and conditions may be displayed or communicated, such as on the customer's computer, through a telephone or the like. The terms and conditions may include expiration dates where the value in an account may be reduced or eliminated if not used within a certain time, exchange rates, terms of promotions or loyalty programs, and the like.

Another feature is the ability to transfer value between accounts as shown in step 88. This may be an intra entity transfer as shown in step 90 where value is transferred between purses of the same entity account or between different accounts of the same entity, or an inter entity transfer as shown in step 98 where value is transferred between accounts of different entities. If the transfer is intra entity, the customer is requested to identify the purses and/or accounts that are to be involved in the transfer as shown in step 92. For example, value may be transferred between a points purse and a cash purse of the account within a given entity or between accounts of a given entity. As another example, value may be transferred between different accounts within the same entity. For instance, if a customer had purchased two gift cards from the same retailer, the value may be combined onto a single card so that only one card would be needed. If needed, conversion rates and transfer details may be displayed to a customer. For example, there may be a transaction fee associated with the transfer. As another example, if points are being converted to cash, the customer may be shown the exchange rate. If the customer agrees with the terms of the transfer, the transfer may be confirmed as shown in step 96. This may be accomplished, for example, by selected an icon on a display screen, by pressing a number on a telephone, verbally, or the like.

If the transfer is inter entity, the customer may identify the entities involved as illustrated in step 100. This may be accomplished, for example, by simply identifying the account identifiers for the two accounts. If the accounts include different purses, the customer may also indicate which purses are to be involved as illustrated in step 102. Similar to intra entity transfers, conversion and transfer details may be displayed as shown in step 102 and the transfer may be confirmed as shown in step 106. The process ends at step 108.

Figure 6:
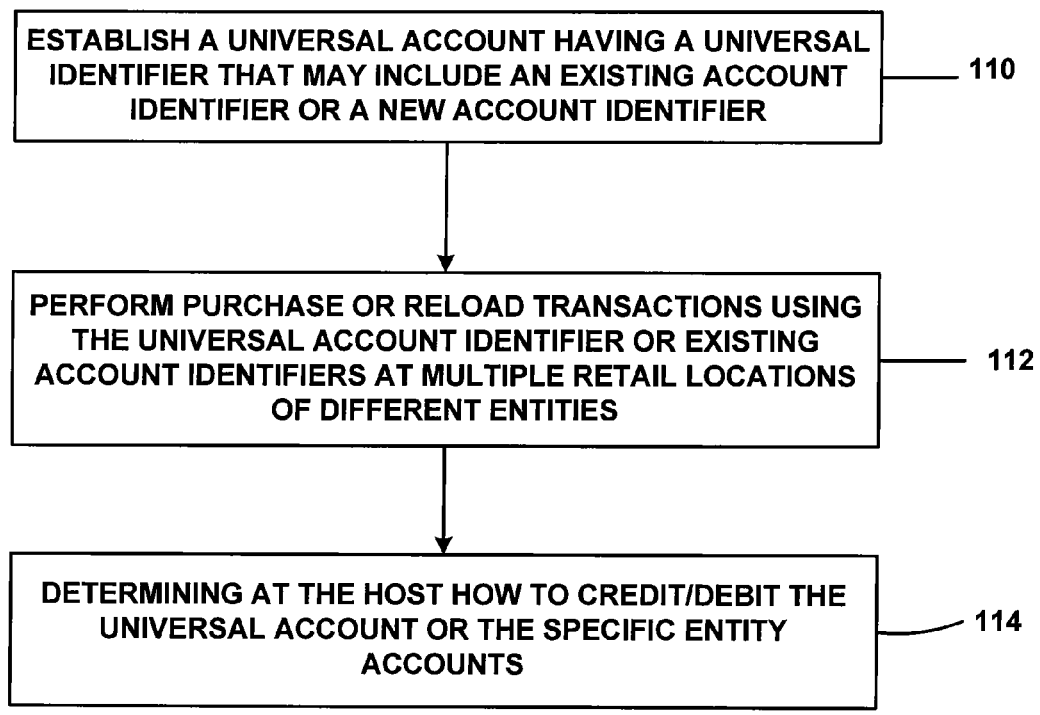
FIG. 6 is a flow diagram illustrating one method for establishing a universal account that is associated with multiple existing stored value accounts according to the invention.

Referring now to FIG. 6, a process for creating and managing a universal account will be described. As shown in step 110, a universal account is established having a universal identifier. Conveniently, the universal identifier may be a new identifier or an identifier of an existing account that is to come under the umbrella of the universal account. One way to establish a universal account is to purchase a presentation instrument that is identified as a universal presentation instrument. This account may be activated in a manner similar to entity accounts at the host computer system. Each entity may chose to be a part of the universal account system so that regardless of the entity where purchases or reloads are made, the same universal account is credited or debited. As previously described, the customer may also chose to associate one or more existing entity accounts with the universal account. In some cases, an existing account may be registered as the universal account.

As shown in step 112, once the universal account is established, purchase or reload transactions may be performing using the universal account identifier or existing account identifiers at any entity that is associated with the universal account. Based on rules at the host computer system (which may optionally be established by the customer), value is added or subtracted from the universal account and/or the specific entity accounts (see step 114). For example, the customer may request that all value be subtracted from the universal account if using the universal number, but come from the specific entity accounts if using an account identifier for a specific entity. As another option, the value may be added or subtracted in some given proportion between two or more of the accounts. Further, it will be appreciated that other combinations of how value is added and subtracted may be used.

Referring now to FIG. 7, one example of a screen display 120 that may be displayed on a display screen to summarize account information will be described. When logging into an account management web site, the customer may be provided with a summary of each account that has been registered. In this example, John Doe has registered a universal account and accounts with two other entities. Further, each account has three associated purses. All of this information may be displayed on the display screen. Further, some of the text may be a hypertext link to take the customer to another screen where additional information may be displayed. For example, when selecting an account, a display screen may be displayed showing all of the transactions associated with that account including the original activation, purchases, reloads, transfers and the like. When the purses are selected, exchange rates or promotions for using a given purse may be displayed.

Figure 8:
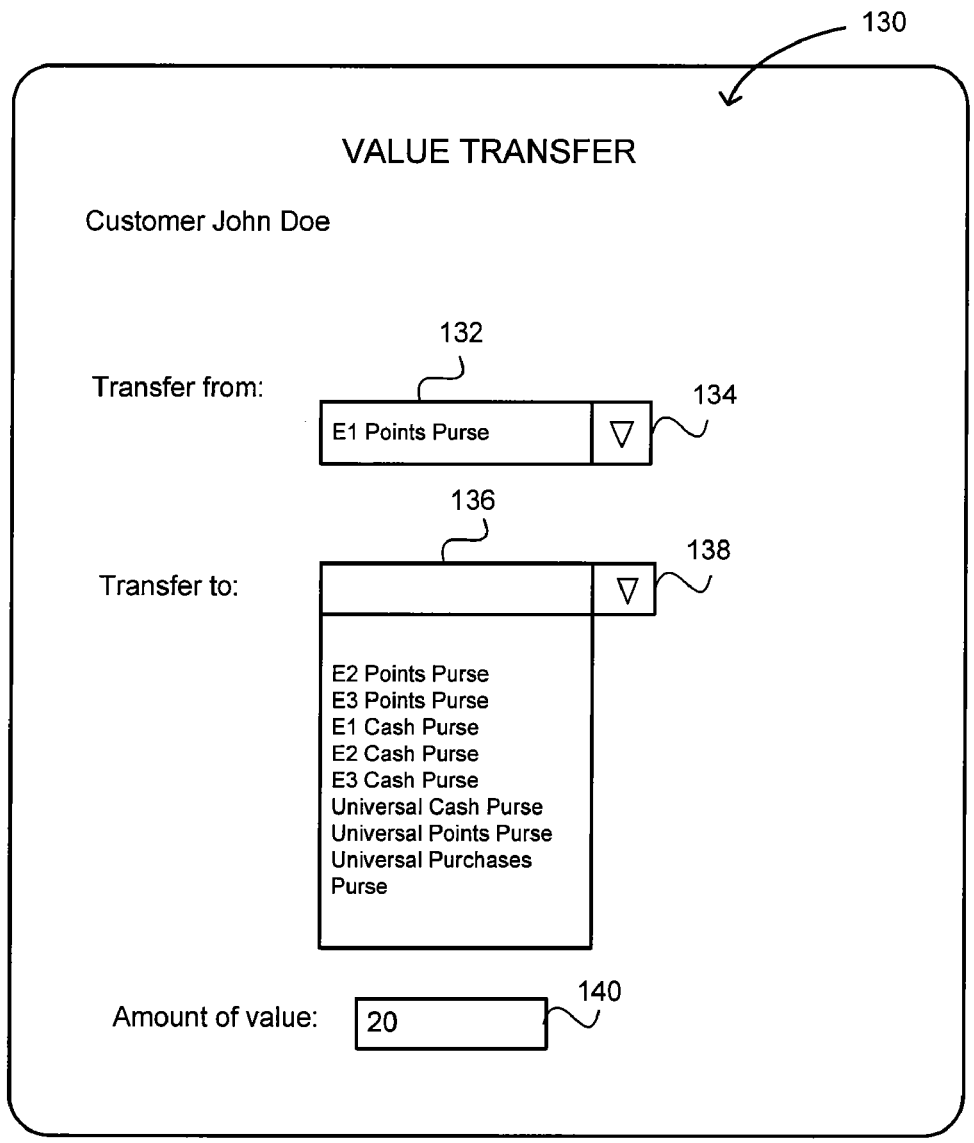
FIG. 8 illustrates a screen display that may used to facilitate the value of transfer between purses and/or stored value accounts according to the invention.

FIG. 8 illustrates a display screen 130 that may be used to facilitate the transfer of value between accounts. Display screen 130 includes a transfer from field 132 where the name of the account where value is to be transferred from may be entered. Conveniently, an icon 134 may be selected to provide a drop down list of each of the accounts where value may be transferred from. In this case, value is to be transferred from the points purse of the account associated with entity 1.

Display screen 130 also includes a transfer to field 136 where the name of the account where value is to be transferred into may be entered. Conveniently, an icon 138 may be selected to provide a drop down list of each of the accounts where value may be transferred into. Further a field 140 is provided to permit the customer to input the amount of value to be transferred. In this case, the value is 20 points since a points purse was selected as the account where value is being transferred from.

FIG. 9 illustrates a display screen 150 that summarizes the details of the transaction and requests a confirmation. In this example, the customer is told that 20 points are being transferred from the entity 1 points purse into a cash purse of an entity 2 account. The exchange rate of 2 points for one dollar is also disclosed. Below this is a summary of how the customer's accounts will look if the transferred is confirmed. As shown in comparison with FIG. 7, the points purse of entity 1 now has only 3 points while the cash purse of entity 2 is at $98. The customer may select a confirm icon 152 to confirm and complete the transfer. The information is stored at the host computer system and may be immediately recorded to permit the customer to make the changes to the accounts in real time.

The invention has now been described in detail for purposes of clarity and understanding. However, it will be appreciated that certain changes and modifications may be practiced within the scope of the appended claims.

What is claimed is:

1. A computerized method for managing electronically stored value accounts, the method comprising:

storing at a host computer system a plurality of stored value customer accounts that each comprise a unique identifier, wherein each of said stored value customer accounts is associated with a retail entity and associated with a presentation instrument purchased at a retail site, wherein the stored value customer accounts may be used to purchase goods offered for sale at the retail sites;

receiving at the host computer system from a point of sale device requests to activate at least some of the accounts, wherein the requests to activate comprise the unique identifiers and values that are associated with the identifiers;

receiving at the host computer system a request to purchase a good from one of the retail entities, wherein the request includes a cost of the good and the identifier, and debiting the stored value customer account by the cost of the good;

receiving at the host computer system a request to transfer value from one of the customer accounts to another one of the customer accounts; and electronically transferring the requested value between the accounts.

2. A method as in claim 1, wherein the request to transfer value includes the unique identifier for each of the associated customer accounts.

3. A method as in claim 1, further comprising receiving at the host computer system a registration request from a customer to associate a plurality of the consumer accounts into a combined account.

4. A method as in claim 3, wherein the registration request includes the account identifiers for each of the customer accounts that are to be associated, and a user name and a password.

5. A method as in claim 4, further comprising generating with the host computer system an electronic summary document containing a summary of each of the customer accounts in the combined account, and transmitting the summary document over a network to a user computing device.

6. A method as in claim 1, further comprising generating with the host computer system an electronic transfer document containing fields for entering the request to transfer value between the customer accounts, and transmitting the transfer document over the network to a user computing device.

7. A method as in claim 6, further comprising generating with the host computer system a confirmation document containing a summary of the transfer request, and transmitting the confirmation document over the network to the user computing device.

8. A method as in claim 1, wherein at least some of the stored value accounts are associated with different retail entities, and further comprising facilitating with the host computer system accounting functions between the entities based on how the value is transferred.

9. A method as in claim 1, wherein at least some of the stored value accounts further comprise multiple purses that correspond to different types of stored values, and wherein the request to transfer value includes a selection of one of the purses from each of the customer accounts involved in the transfer.

10. A method as in claim 1, wherein at least some of the stored value accounts further comprise multiple purses that correspond to different types of stored values, and further comprising receiving an intra customer account transfer request to transfer value between purses of the same customer account.

11. A method as in claim 1, further comprising performing a value conversion with the host computer system when transferring the value between the customer accounts.

12. A method as in claim 1, wherein at least some of the stored value accounts further comprise multiple purses that correspond to different types of stored values, and further comprising performing a value conversion with the host computer system when transferring the value between the purses.

13. A method as in claim 12, wherein the value conversion between the purses is a value of a type selected from a group consisting of points, cash values, and purchases.

14. A method as in claim 1, further comprising storing at the host computer system promotional information.

15. A method as in claim 14, wherein the promotional information indicates promotions to encourage transferring of value between customer accounts.

16. A method as in claim 14, wherein the promotional information indicates promotions to encourage adding value to certain customer accounts.

17. A method as in claim 14, wherein the promotional information indicates promotions to encourage the use of value from certain ones of the customer accounts to purchase certain goods or services.

18. A method as in claim 1, wherein the requests to activate the accounts comprise purchases of stored value cards from retail locations, and wherein the unique identifiers are read from the cards using point of sale devices.

19. A method as in claim 1, further comprising receiving at the host computer system reload information on the purchase of value of one of the existing customer accounts.

20. A method as in claim 1, further comprising setting expiration dates on the customer accounts.

21. A computerized method for managing electronically stored value accounts, the method comprising:
    storing at a host computer system a plurality of stored value customer accounts that each comprises a unique identifier and an associate value;
    wherein each of said stored value customer accounts is associated with a retail entity and with a presentation instrument that is activated via a point-of-sale device; and wherein at least some of the stored value accounts are associated with different retail entities, and wherein the stored value accounts may be used to purchase goods offered for sale at the retail entities;
    receiving at the host computer system a request to purchase a good from one of the retail entities, wherein the request includes a cost of the good and the identifier, and debiting the stored value account by the cost of the good;
    receiving at the host computer system a request to transfer value from one of the customer accounts that is associated with one of the retail entities to another one of the customer accounts that is associated with another one of the retail entities; and
    electronically transferring the requested value between the accounts.

22. A method as in claim 21, wherein the request to transfer value includes the unique identifier for each of the associated customer accounts.

23. A method as in claim 21, further comprising receiving at the host computer system a registration request from a customer to associate a plurality of the consumer accounts into a combined account.

24. A method as in claim 23, wherein the registration request includes the account identifiers for each of the customer accounts that are to be associated, and a user name and a password.

25. A method as in claim 24, further comprising generating with the host computer system an electronic summary document containing a summary of each of the customer accounts in the combined account, and transmitting the summary document over a network to a user computing device.

26. A method as in claim 21, further comprising generating with the host computer system an electronic transfer document containing fields for entering the request to transfer value between the customer accounts, and transmitting the transfer document over the network to a user computing device.

27. A method as in claim 26, further comprising generating with the host computer system a confirmation document containing a summary of the transfer request, and transmitting the confirmation document over the network to the user computing device.

28. A method as in claim 21, wherein at least some of the stored value accounts further comprise multiple purses that correspond to different types of stored values, and wherein the request to transfer value includes a selection of one of the purses from each of the customer accounts involved in the transfer.

29. A method as in claim 21, wherein at least some of the stored value accounts further comprise multiple purses that correspond to different types of stored values, and further comprising receiving an intra customer account transfer request to transfer value between purses of the same customer account.

30. A method as in claim 21, further comprising performing a value conversion with the host computer system when transferring the value between the customer accounts.

31. A method as in claim 21, wherein at least some of the stored value accounts further comprise multiple purses that correspond to different types of stored values, and further comprising performing a value conversion with the host computer system when transferring the value between the purses.

32. A method as in claim 31, wherein the value conversion between the purses is a value of the type selected from a group consisting of points, cash values, and purchases.

33. A method as in claim 21, further comprising storing at the host computer system promotional information.

34. A method as in claim 33, wherein the promotional information indicates promotions to encourage transferring of value between customer accounts.

35. A method as in claim 33, wherein the promotional information indicates promotions to encourage adding value to certain customer accounts.

36. A method as in claim 33, wherein the promotional information indicates promotions to encourage the use of value from certain ones of the customer accounts to purchase certain goods or services.

37. A method as in claim 21, wherein the requests to activate the accounts comprise purchases of stored value cards from retail locations, and wherein the unique identifiers are read from the cards using point of sale devices.

38. A method as in claim 21, further comprising receiving at the host computer system reload information on the purchase of value of one of the existing customer accounts.

39. A method as in claim 21, further comprising setting expiration dates on the customer accounts.

40. A computerized method for managing electronically stored value customer accounts from a customer computer, the method comprising:
   receiving at the customer computer from a host computer system an electronic document used to produce a display having fields for requesting value to be transferred from purses of one customer stored value account to purses of the same customer stored value account or to another customer stored value account;
   wherein each of said customer stored value accounts is associated with a retail entity and associated with a presentation instrument that is activated via a point-of-sale device;
   transmitting the request from the customer computer to the host computer system;
   receiving at the customer computer from the host computer system an electronic document having a summary of the transfer request including a conversion of value between the purses; and
   transmitting a confirmation of the request from the customer computer to the host computer system.

41. A computerized method for managing electronically stored value accounts, the method comprising:
   storing at a host computer system a plurality of stored value customer accounts that each comprise a unique identifier and an associated value, wherein each of said stored value customer accounts is associated with a retail entity and associated with a presentation instrument that is activated via a point-of-sale device, wherein the stored value customer accounts may be used to purchase goods offered for sale at the retail entities;
   receiving at the host computer system a request to purchase a good from one of the retail entities, wherein the request includes a cost of the good and the identifier, and debiting the stored value customer account by the cost of the good;
   receiving at the host computer system a registration request from a customer to associate a plurality of the consumer accounts into a combined account, wherein the request includes the account identifiers for each of the customer accounts that are to be associated;
   receiving at the host computer system a request to transfer value from one of the customer accounts to another one of the customer accounts; and
   electronically transferring the requested value between the accounts.

42. A method as in claim 41, wherein the registration information further includes rules for allocating how values are to be credited and debited to and from the customer accounts.

43. A method as in claim 42, further comprising receiving at the host computer system from a point of sale device purchase or reload values for one of the accounts and allocating the purchase or reload values based on the registration information.

44. A host computer system comprising:
   a first input that is adapted to receive information over a network from at least one point of sale device;
   a second input that is adapted to receive information over a network from a customer computer;
   an output that is adapted to send information over the network to at least one point of sale device;
   a processor; and
   a memory accessible by the processor that includes a plurality of stored value customer accounts that each comprise a unique identifier, wherein each of said stored value customer accounts is associated with a retail entity and associated with a presentation instrument purchased at a retail site;
   wherein the first input is further adapted to receive from the point of sale device requests to activate at least some of the accounts, wherein the requests to activate comprise unique identifiers and values that are associated with the identifiers;
   wherein the second input is configured to receive requests to transfer values between at least some of the accounts; and
   wherein the processor is configured to transfer value from one of the customer accounts to another one of the customer accounts based on information received from the second input.

45. A host computer system comprising:
   a first input that is adapted to receive information over a network from point of sale devices that are located at different retail entities;
   a second input that is adapted to receive information over a network from a customer computer;
   an output that is adapted to send information over the network to the point of sale devices;
   a processor; and
   a memory accessible by the processor that includes a plurality of stored value customer accounts that each comprise a unique identifier and an associate value, wherein each of said stored value customer accounts is associated with a retail entity and associated with a presentation instrument that is activated via a point-of-sale device;
   wherein the second input is further configured to receive a request to transfer value from one of the customer accounts that is associated with one of the retail entities to another one of the customer accounts that is associated with another one of the retail entities; and
   wherein the processor is configured to electronically transfer the requested value between the accounts.

* * * * *